(12) United States Patent
Holbrook et al.

(10) Patent No.: US 10,696,448 B1
(45) Date of Patent: Jun. 30, 2020

(54) MAKING A PLASTIC TANK WITH AN INTEGRITY-VERIFIABLE WELD JOINT

(71) Applicant: Infiltrator Water Technologies, LLC, Old Saybrook, CT (US)

(72) Inventors: Paul R Holbrook, Old Saybrook, CT (US); Roy E Moore, Jr., Killingworth, CT (US); Bryan A Coppes, Old Saybrook, CT (US); Gregory Trude, Bristol, CT (US)

(73) Assignee: INFILTRATOR WATER TECHNOLOGIES LLC, Old Saybrook, CT (US)

( * ) Notice: Subject to any disclaimer, the term of this patent is extended or adjusted under 35 U.S.C. 154(b) by 327 days.

(21) Appl. No.: 15/413,219

(22) Filed: Jan. 23, 2017

Related U.S. Application Data

(60) Provisional application No. 62/286,251, filed on Jan. 22, 2016.

(51) Int. Cl.
| | | |
|---|---|---|
| *B65D 6/00* | (2006.01) | |
| *E03B 11/02* | (2006.01) | |
| *G01M 3/32* | (2006.01) | |
| *B29C 65/02* | (2006.01) | |
| *B29L 31/00* | (2006.01) | |

(52) U.S. Cl.
CPC .............. *B65D 11/10* (2013.01); *B29C 65/02* (2013.01); *E03B 11/02* (2013.01); *G01M 3/3272* (2013.01); *B29L 2031/712* (2013.01)

(58) Field of Classification Search
CPC ....... B29C 65/02; B29C 66/522; B29C 66/13; B29C 66/71; B29C 66/8322; E03B 11/02; B29L 2031/712
See application file for complete search history.

(56) References Cited

U.S. PATENT DOCUMENTS

| | | | |
|---|---|---|---|
| 4,002,055 A | 1/1977 | Kops | |
| 4,586,624 A * | 5/1986 | Shaw | B29C 66/542 220/613 |
| 5,407,514 A | 4/1995 | Butts et al. | |
| 5,407,520 A * | 4/1995 | Butts | B29C 63/24 156/149 |
| 7,984,738 B2 | 7/2011 | Lamarca | |
| 8,096,168 B2 | 1/2012 | Richter | |
| 2007/0262495 A1* | 11/2007 | Bitner | B29C 65/56 264/574 |
| 2008/0067179 A1* | 3/2008 | Graf | B29C 65/02 220/565 |
| 2016/0207254 A1 | 7/2016 | Moore, Jr. et al. | |

OTHER PUBLICATIONS

"EF Dost Coupler" Jan. 19, 2017; 6 website pages, www.strongbridge.us, Strongbridge International, Jacksonville, Florida.

* cited by examiner

*Primary Examiner* — Peter L Vajda
*Assistant Examiner* — Caroline Montiel
(74) *Attorney, Agent, or Firm* — C. Nessler

(57) ABSTRACT

A plastic tank is comprised of two parts, a base and a top, that are permanently joined to each other by welding at a circumferential joint formed by two mating flanges of the parts. Fusion weld elements are captured on the faying surfaces of the flanges of the assembled parts, and the elements are melted by internal heating of metal portions of the elements. Two spaced apart circumferential welds which define an annular space are formed. The pressure within the annular space is changed in a test procedure to verify the integrity of the welds.

8 Claims, 5 Drawing Sheets

MAKING A PLASTIC TANK WITH AN INTEGRITY-VERIFIABLE WELD JOINT

This application claims benefit of provisional patent application Ser. No. 62/286,251, filed Jan. 22, 2016.

TECHNICAL FIELD

The present invention relates to tanks made of molded plastic that are useful for storing water and other liquids and methods for making same.

BACKGROUND

It is common to store water in unpressurized aboveground vessels from which water from time to time is drawn by means of pump or gravity flow, particularly where the water supply is intermittent, or where the instantaneous demand exceeds the flow rate of the source of supply. It is particularly desirable, to have a vessel which is sealed against egress or ingress of liquids when potable water is being stored.

Typical water storage tanks that are associated with dwellings and other smaller buildings will have 500 to 1000 liter capacity. A squat cylindrical shape tank is popular for reason of compactness and manufacturability. A representative 500 liter tank might be about 100 cm in diameter and 100 cm high. One approach is to make a one piece plastic tank, such as by blow molding or rotational molding. Such tanks have good integrity but owing to their bulkiness, the cost of shipping from factory to point of use can be high.

The present invention is concerned with plastic tanks that principally are intended for use when oriented as vertical cylinders, including tanks which are much larger than just mentioned. For instance, plastic tanks may have capacities of in the range of about 9,500 liters to about 11,000 liters or more. A representative tank may have a diameter of about 8 feet (2.4 meters), a height of about 8 to 10 feet (2.4 to 3.1 meters), a basic wall thickness of 0.19 to 0.4 inches (4.8 to 10 mm) and a weight of about 250 to 400 pounds (114 to 180 kilograms. If such tanks can be fabricated by mating two bucket-like parts and which are then welded to each other at or near the point of use, that can be a practical solution when the parts have sufficient draft to enable nesting for shipment.

Tanks comprised of mating half tanks which can be nested for shipment and assembled in proximity to the point of use have been made. For example, see U.S. Pat. No. 5,878,907 of Graf and U.S. Pat. No. 8,740,005 of Holbrook et al. Such tanks have a mid-elevation joint which is alternatively secured by means of clamps or by means of welding.

Aims of the present invention relate to the fabrication such types of tanks and with verifying that the weld between flanges is good. When the weld joint is formed at a location which is not like the controlled environment of a manufacturing plant, perhaps by workers who infrequently do that kind of welding work, the joint should be able to readily made, and its integrity verified.

Richter U.S. Pat. No. 9,096,168 describes methodology that is related to the present invention. A tank is formed by joining two double-wall blow molded plastic segments to each other using inner and outer circumferential welds. A vacuum is drawn through a port drilled into one of the welds, to penetrate the annular space between the weld. If there is a leak, the vacuum will be lessened. See also Kops U.S. Pat. No. 4,002,055 for an application of the same technique for testing the joint between seams of joined-together sheet material.

SUMMARY

An object of the present invention is to provide a large vertical cylindrical style tank that can be shipped as separate nested elements, each having a joint-flange, and assembled with a joint which has good integrity (i.e., it is leak proof) and where the integrity of the weld may optionally be verified by application of pressure or vacuum. Another object is to provide features on a tank so it can conveniently be assembled and cleaned.

In accord with an embodiment of the present invention a fusion weld element is placed within the flanged joint of a base and top combination so that two concentric welds will be created, thereby to define an annular cavity within the joint; and to form an intersection comprising a fused mass of plastic that connects the inner and outer concentric welds at an intersection location, the fused intersection also capturing the welds formed by the terminal ends of the weld elements where they run radially between the mated flanges. In a preferred embodiment, the weld elements run radially outwardly from the intersection to mating tabs at the outer edge of each flange. After the weld element is heated to cause melting and then cooled, the flanges are attached to each other by the circular running fused weld material and tab may be sheared off for neat exterior appearance of the tank. In other embodiments, two separate weld elements may be used in substantially the same way as described; and more than one fused intersection may be formed.

This foregoing way of creating an assembly and making welds is especially useful when testing of the weld is desired. One or more ports are made through at least one of the flanges before or after welding, to penetrate into the annular space(s) between the concentric welds. Positive or negative pressure may be applied to the port and therefore to the annular space, and change in pressure or flow rate may be monitored with time to indicate the integrity (leak proof soundness) of the welds.

The foregoing and other objects, features and advantages of the present invention will become more apparent from the following description of preferred embodiments and accompanying drawings.

DESCRIPTION

Figure 1:
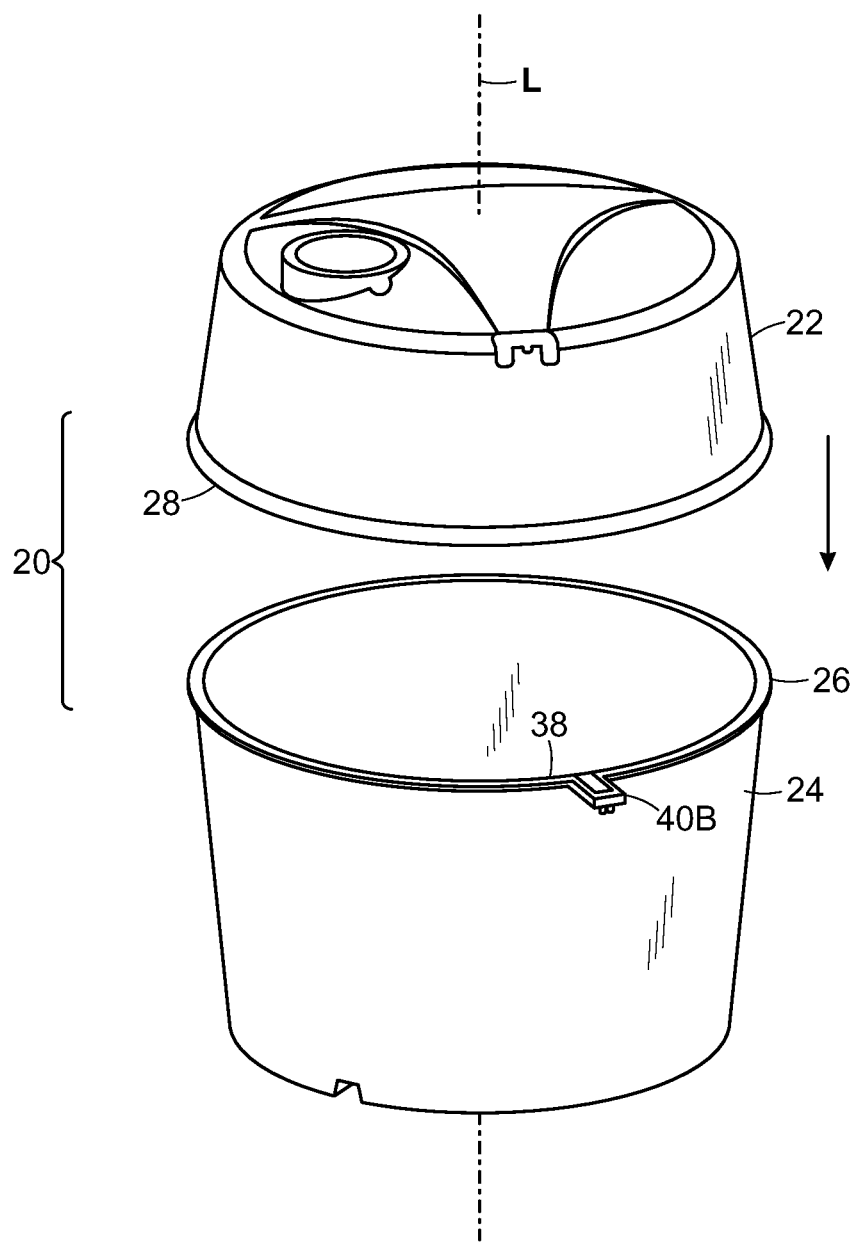
FIG. 1 is exploded view of a plastic tank comprising a base and a top with mating flanges, and a weld element positioned on the flange.
Figure 2:
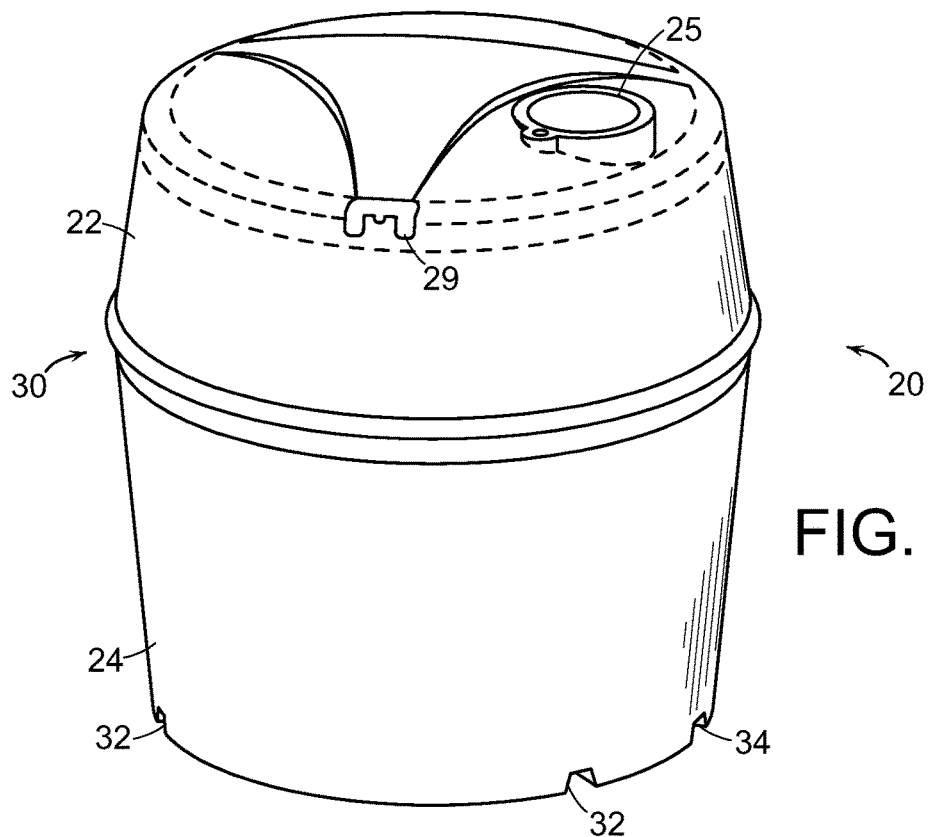
FIG. 2 shows the tank of FIG. 1 after the top has been attached to the base.

FIG. 1 and FIG. 2 show in perspective an embodiment plastic water tank 20, preferably made from injection molded polyethylene or polypropylene, one sub-embodiment of which has the nominal dimensions recited in the Background. While the invention is described in terms of water, the invention will be applicable to a tank made and used for any liquid, including such as fertilizers and pesticides, and fine granular mediums. While the invention is described in terms of a tank that has a circular cross section, and which is substantially cylindrical and used with the length axis of the cylinder in the vertical orientation, the invention is applicable to tanks having other shapes and use orientations. Thus, the term "circular" and its variations and "top" and 'base" should be applied analogously to a tank having a cross section and flange which are non-circular.

In FIG. 1, the parts are shown as they are about to mate as indicated by the arrow. In FIG. 2 the parts are mated at joint 30. Tank 20 comprises a base 24 having flange 26 and a top 22 having flange 28; both are aligned along a central tank axis A. The flanges mate to each other at joint 30. The base and top can be shipped in nested condition on a pallet or the like, preferably in the orientations shown in FIG. 3 and FIG. 4. The top has an access port 25 for filling, etc. and may have a gage port and other ports. Top 22 has scalloped features as illustrated, for structural strengthening against exterior loads that may be applied to the top. Corrugations and other strengthening features may be formed in the side walls and ends of alternative embodiment bases and tops.

The periphery of the bottom of the base of a tank has one or more recesses at the base which enable a pry bar or the like to be used to tilt the bottom of the tank (and any attached top), for purpose of causing residual liquid run to the opposing side of the tank from the lifting point. The top has fittings for attachment of a sling. Both of the features are referred to as lifting lugs.

Figure 3:
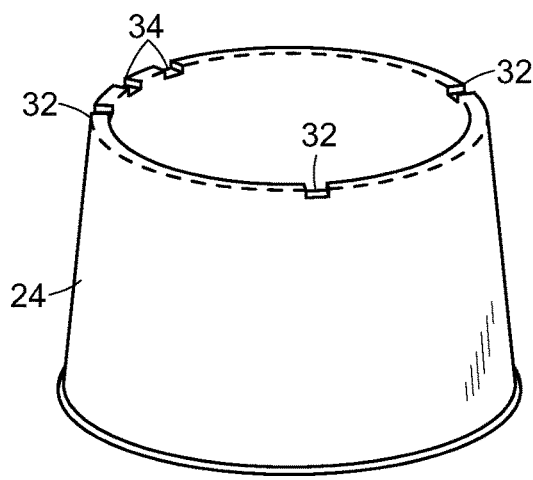
FIG. 3 shows the base of the tank in inverted position.
Figure 4:
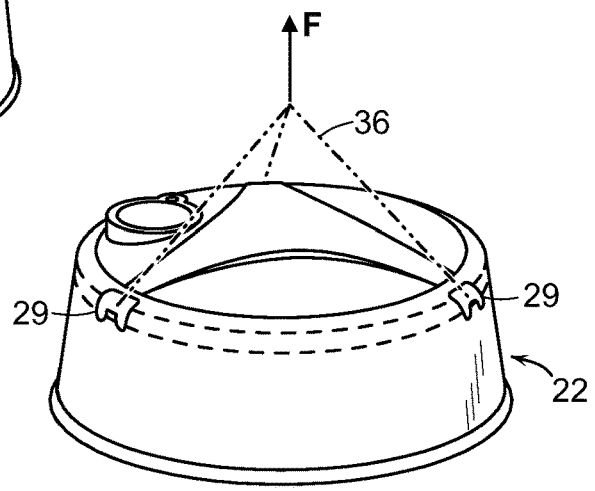
FIG. 4 shows the top of the tank with a lifting harness in phantom.

With reference to FIG. 2 and FIG. 3 which shows the base inverted, a set of three, optionally more than three, lifting lugs 32 is molded into base. A top shown in FIG. 4 has corresponding lugs 29 for attachment of a lifting harness 36 (shown in phantom), so the part can be lifted for assembly or other movement, as indicated by arrow F in FIG. 4. The base also has one or more lifting recesses 34. A lifting lug provides locally shaped structure for attaching a chain, wire or rope loop, or fitting. In contrast a lifting recess is a depression in the surface which extends transverse to the lengthwise axis of the tank, with an opening sufficient for a worker to insert a pry bar that, when manipulated, presses upwardly on the base of the tank. A lifting recess is not intended to provide means for attachment of something to lift the tank bottom. When the base of an almost empty tank is tilted by prying upwardly a lifting recess, whatever residual water or other material is in the tank will flow to the side opposite the pry-point, which facilitates emptying and cleaning of the tank, such as by means of a suction hose or absorbent material.

In the present invention, the joint between the flanges of the top and base is formed by welding. A preferred method of welding by using an electrically heated weld element captured within the joint is described in commonly owned patent application Ser. No. 14/993,858 of Bryan Coppes et al., filed Jan. 12, 2016, entitled "Fabricating a plastic stormwater chamber" (the "858 application") and in commonly owned patent application Ser. No. 14/809,124 of R. Moore and P. Holbrook, filed Jul. 24, 2015, entitled "Plastic tank having fusion welded parts" (the "124 application"), shown in Pat. App. Publication 2016/0207254). The disclosures of said applications are hereby incorporated by reference. The disclosure of provisional patent application Ser. No. 62/286, 251, filed Jan. 22, 2016, entitled "Plastic water tank with integral means for weld testing," which this application claims benefit of, is hereby incorporated by reference.

A fusion weld element as the term is used here refers to a component which can be heated by electrical or electromagnetic energy, sufficient to cause localized melting and fusion of both the element and the local plastic material of the parts being joined. Exemplary fusion weld elements comprise plastic with embedded metal pieces that are heated by electric resistance or electromagnetic induction are described further below. Some commercial products are described below. Typically, a plastic fusion weld element has the same nominal composition the material comprising the tank parts which are being welded. Exemplary tank materials include polypropylene and polyethylene.

Placement of a fusion weld element may be accomplished in different ways. Generally, the fusion weld element is positioned on or just beneath the surface of a flange which faces the mating flange surface. The surfaces which face each other and are shaped to facilitate forming of a weld joint are referred to as faying surfaces. In one approach, the fusion weld element may be molded into the material of one or both of the faying surfaces of flanges. Alternately, the weld element may be placed partly or wholly within in a groove that is formed on one of the faying surfaces. In a further alternative, a weld element may be simply captured between the faying faces as they are pressed toward each other just prior to welding. Reference may be made to the aforementioned application Ser. No. 14/993,858.

Preferably, in the present invention, the latter technique of laying the weld on a faying surface and capturing it within the press-together joint is used; the fusion weld element may be plastic-tack welded to a faying surface. To make the weld, by applying electromagnetic energy the fusion weld element(s) is raised in temperature sufficient to melt the fusion weld element and local portions of the mating plastic surfaces as the faying surfaces are simultaneously pressed toward each other. The application of energy is then ceased and the weld zone is allowed to cool. The resultant solid weld joint is fused plastic which weld-joins the two parts. Artifact from the metal portion of the fusion weld element may remain within the fused plastic weld material. In this approach, a fusion weld element may be placed on one of the faying surface before they are mated, alternately an element may be placed on each faying surface.

The fusion weld element (which may be also referred to a fusion element or weld element or simply an element herein) which is used in a preferred embodiment of the method described above is a component which may be heated, such as by electric resistance heating or electromagnetic induction heating to induce melting of a conductive (usually metal) portion of the weld element and local plastic environment.

As an example, the fusion weld element may be a commercial product known as PowerCore™ Welding Rod (PowerCore International Ltd., Ottawa, Ontario, Canada). See also U.S. Pat. Nos. 5,407,514 and 5,407,520, the disclosures of which are hereby incorporated by reference. An exemplary PowerCore brand rod is an about ³⁄₁₆ inch diameter thermoplastic rod having integrated electric resistance wires of very fine diameter. The ends of the rod run out of the joint/part at selected end points; and when the wires comprising the rod are connected to an electric power source they rise in temperature and heat the rod and surrounding plastic causing melting and fusion. The fine wires remain a part of the finished joint. That portion of the fusion weld element which sticks from the end of the joint is severed, as by chiseling or cutting, and discarded. This is the preferred method which is used in the description which follows.

As another example, the fusion weld element may be the preform which is part of the commercial Emabond™ electromagnetic welding system (Emabond Solutions Co., Norwood, N.J., U.S.) As described in Lamarca U.S. Pat. No. 7,984,738 (the disclosure of which is hereby incorporated by reference) the fusion weld element preform may be a structure comprised of plastic and magnetic particles. When an energized high frequency induction coil is placed in proximity to the joint, the particles act as susceptors of electromagnetic radiation and resultant induced eddy currents cause the element to become heated sufficiently to melt the preform and adjacent plastic, thereby fusing the joint. The metal particles remain within the fused plastic part. The Emabond system does not require electric connection to the ends of the weld elements, as do the resistively heated elements of the PowerCore system.

Figure 5:
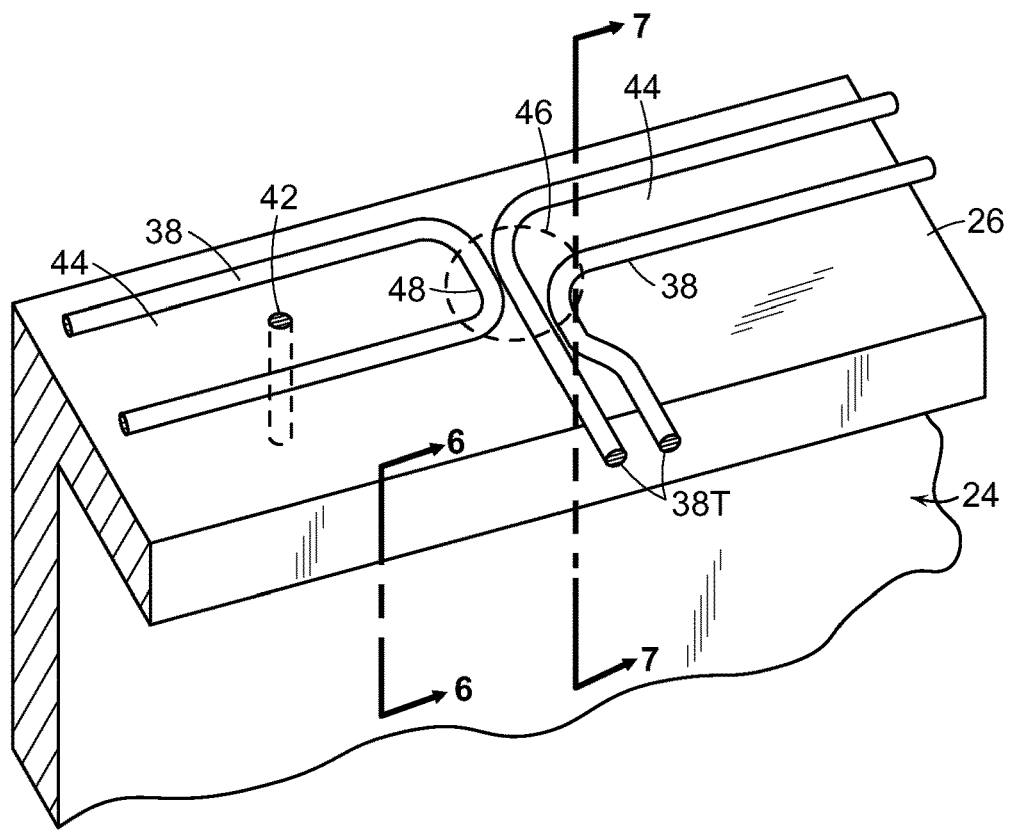
FIG. 5 is a more detailed view of the flange showing the weld element loop and terminal end intersection.

Referring again to the drawings here, in an embodiment of the invention, a PowerCore type of weld element 38 is placed on one of the flanges by tack welding, and when the flanges are mated with each other, electric power is applied to the terminal ends 38T of the weld element, to melt it and adjacent flange material by resistance heating. FIG. 5 shows a portion of the circumference of the upper end of a base with a weld element 38 on the surface of the flange 26. (In an alternative embodiment, the weld element may be tack welded to the surface of the flange 28 of the top.)

Figure 5A:
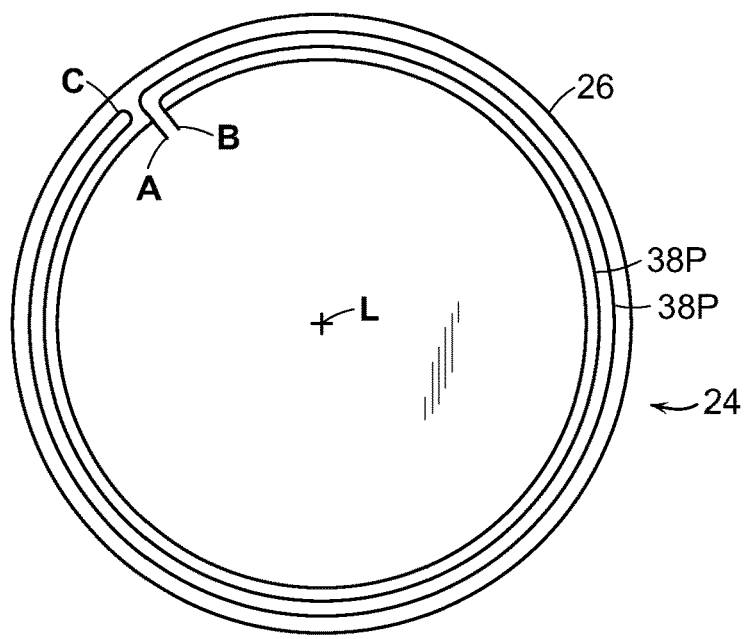
FIG. 5A is a top view of a base showing how a weld element runs on a loop-path on the flange.

FIG. 5A is a top-down view of the base part of the tank, shows surface of flange 26 and the U-shape path 38P that the weld element 38 follows. FIG. 5 shows a local portion of the same, adding detail as to the exact running of the element 38.

Referring to both Figures, the weld element has two terminal ends 38T, also labeled A and B. The path of weld element 38 starts with one terminal end at point A, runs around the circumference of the flange to a switch back or "U turn" 48 at point C, and retraces its path to point B, where is the second terminal end 38T. There is annular spacing (and after welding becomes an annular cavity 44) between the legs of the element 38.

In this description: "terminal end" refers to the portion of the weld element which is proximate the location where a weld element runs radially to exit the joint between the flanges. The terminal end of a weld element may extend further from the outer edge of a flange, as the user may choose. The term "annular" is applied to the space/cavity between the weld elements and the welds even though, as described below a weld mass at intersection 46 interrupts the complete circularity of the annular cavity 44. Thus, in this description, "annular" encompasses a space which but for an interruption such as a mass at one or more intersections of welds would run circularly around the whole faying surface of the flange.

A passageway, namely port 42, runs from a point on the flange faying surface which is between the two legs of the element 38 to the exterior surface of the flange, which overhangs the sidewall of the tank base 24. Optionally, the port may be located to penetrate the annular cavity between the legs of the weld element elsewhere around the flange, or in the flange of the mating tank part.

Figure 6:
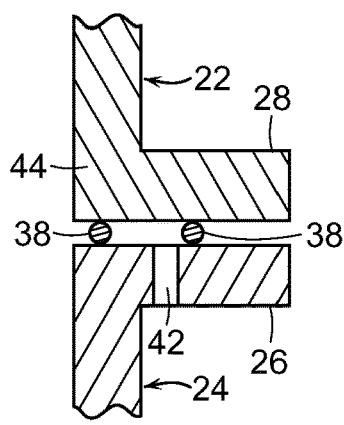
FIG. 6 is a vertical plane cross section through a flange joint prior to welding, showing placement of the weld elements.
Figure 7:
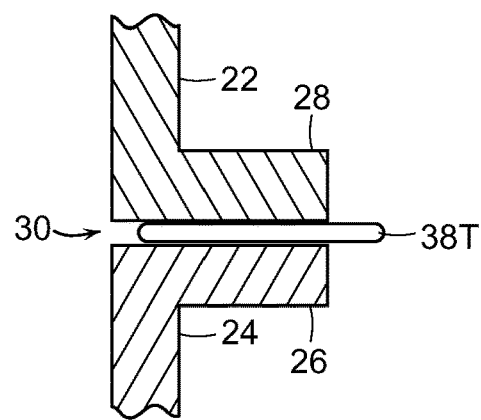
FIG. 7 a cross section like FIG. 6, showing how the terminal ends of the weld element run.

The vertical cross section of FIG. 6 (shown now with the flange 28 of the top, positioned for welding) shows how port 42 is in communication with the space 44 and the exterior surface of the flange/base. FIG. 7 shows how a typical terminal end 38T of the weld element runs radially outward between the faying surfaces of a base and top assembly, when it is ready for welding. In a variation, the terminal ends of the weld element run into the interior of the tank.

Figure 8:
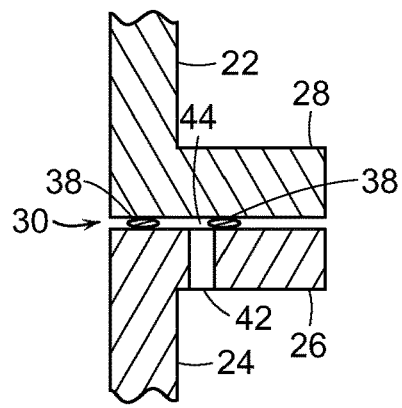
FIG. 8 is a view like FIG. 6, showing how the flanges are connected by a fused weld after melting and cooling of the weld element.

FIG. 8 is a view like FIG. 6, showing a portion of the tank after welding. The weld elements 38 have flattened and fused to the faying surfaces of the mating flanges 26, 28, to form the weld joint 30. An exemplary weld element may be about 0.19 inch in diameter and when flattened it may have a width of about 0.3 inches. The character of the weld element, the spacing of the portions of the weld element, and the weld process, are controlled so that after welding there no fused material which will connect the circular-running concentric spaced-apart legs of the U shape loop 38, thus ensuring there is an annular space/cavity 44 between the spaced apart weld elements; and that port 42 is still open and in communication with the cavity 44. Optionally, port 42 can be machined into the flange after welding. When the terms "circular" and "concentric" are used herein, they comprehend that there may be unevenness and lack of perfection with respect to such.

Figure 9:
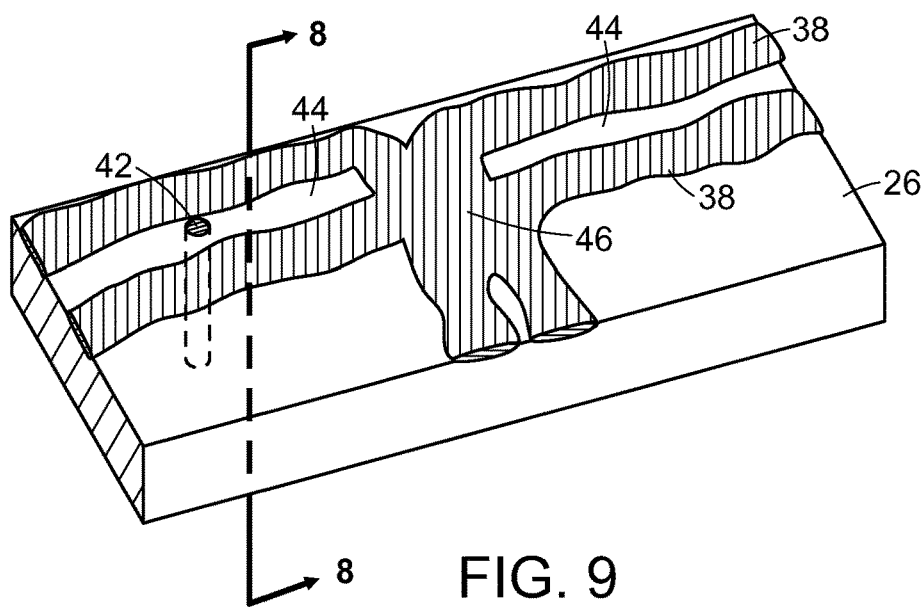
FIG. 9 is a view like FIG. 5, showing the fused weld as it would appear after the top flange has been cut-away.

Referring again to FIG. 5, the portions of the weld element 38 which are near the terminal ends 38T of the element run in close proximity to each other and in close proximity to the loop end 48. FIG. 9 is a view like that of FIG. 5 after welding has been carried out. Flange 28 is cut away to reveal the weld element 38 which is now melted and fused to the faying surface of flange 26. It will be appreciated that the space 44 is a closed cavity, but for the port 42; and the end 48 of the loop has fused with other portions of element 38 at intersection 46 which is a fused mass of weld material. Thus, with respect to the interior of the tank, other than a not-likely path through the mass of fused plastic at intersection 46, the only path for water to escape from the tank would be to flow through the annular cavity 44.

To test the integrity of the weld joint—to verify that the weld joint is leak-proof, a vacuum from a pump or venturi or other source is applied through a pipe line to the exterior opening of port 42, to evacuate cavity 44. For example, a negative pressure of 6 inches of mercury might be applied. In one approach, a valve connecting the vacuum pump to the port is then closed, and the vacuum level in the cavity 44 is observed over a period of time, as by use of a vacuum gage connected to the pipeline between the valve and the port 42. If the vacuum does not decay meaningfully over time, then that shows that each of the circular welds are good and the tank will not leak when filled with water or other liquid. Experiment will show what if any slow decay in vacuum level is characteristic of a no-water-leak weld, making appropriate allowance for other effects, such as out-gassing.

In the alternative way of testing, the pressure-change system includes instrumentation which measures the rate at which air or other gas has to be continuously flowed into or out of space 44 (as applies), sufficient to maintain the changed pressure. A source of pressurized gas may comprise a commercial gas cylinder or a compressor. Again, experiment will show whether a certain show leakage (it there is any) might be tolerable, given the greater viscosity of water compared to air. After testing, the exterior opening of port 42 is preferably sealed by welding or plugging, to thereby provide the tank with a double weld seal, in context that each of the of the circular welds has been shown to be sound and sufficient by itself to provide the desired seal.

In an alternative approach, above-ambient pressure may be applied to the port 42 and measurement made of change in pressure with time, or continuous flow necessary to maintain pressure.

In the generality of this aspect of the invention, the method that is used is: to change, with respect to the ambient pressure (typically atmospheric pressure) of the tank, the pressure in the annular cavity which is bounded by the two concentric-running welds and to measure any inflow to or outflow from the cavity.

The invention enables a much faster and more convenient way of verifying the integrity of the weld between the mating base and top, compared to a more conventional filling of the tank with water, or pressurizing the vessel with some gas that would be detectable by a sensor moved around the exterior of the tank, or by non-destructive inspection, such as ultrasonic or radiographic inspection, or by other know conventional means. The relatively small volume of space 44 means that the time to evacuate or pressurize is short, compared to any means for putting gas or liquid into the whole of the tank.

Figure 10:
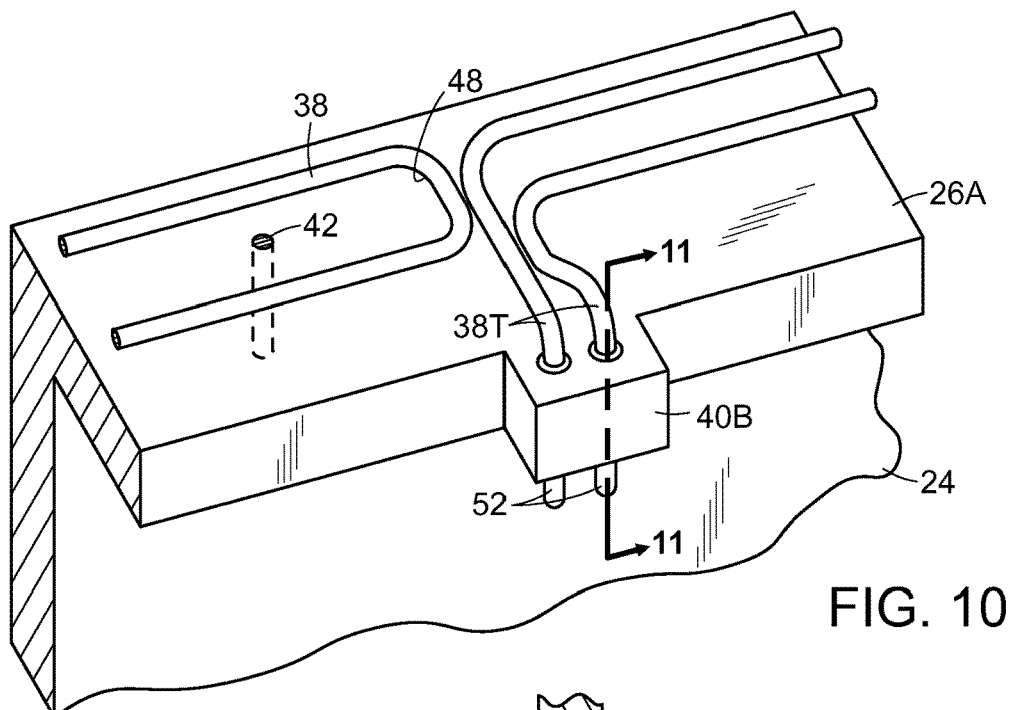
FIG. 10 is a view like FIG. 5, showing terminal ends of weld elements running through a tab that extends outwardly from the flange.
Figure 11:
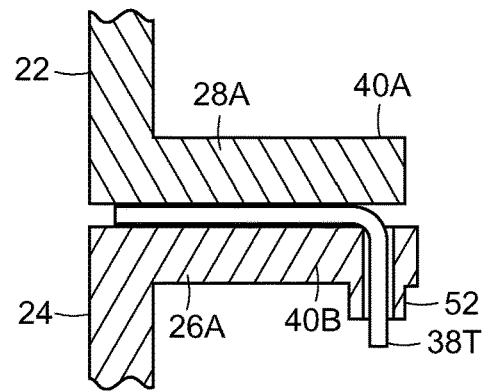
FIG. 11 is a cross section through the article shown in FIG. 10.

The perspective view of FIG. 10 and the partial cross section of FIG. 11 correspond respectively with FIG. 5 and FIG. 7. They illustrate a preferred construction of tank flange having a tab feature for containing the terminal ends of the weld element where they run radially outwardly. Flange 26A has a portion, tab 40B, which extends radially outwardly from the circumference of the rest of the flange. FIG. 11 shows that the flange 28A of the top has a mating tab 40A. The terminal ends 38T of the weld element extend radially outwardly and then lengthwise downwardly within collars 52 of tab 40B, optionally through the collars as pictured, for convenient connection to the power supply and for better holding of the terminal ends in the desired position. Optionally, one or both terminal ends may run through the tab 40A of flange 28A.

In another embodiment of a tank with a flange having a tab, there are no collars and the terminal ends run radially outward, in the same manner as shown in FIG. 7. After the fusion welding process is completed, for neatness the tabs 40A, 40B and the weld element fused therebetween are sheared away, so the flange exterior edge is comparatively smooth and circular. In a variation, there are mating tabs on the interior of the tank at the flange location and one or both terminal ends run there, instead of on the exterior. While tabs are preferably integrally molded with a flange, optionally a tab may be a separate element which is either attached to the outer edge of the flange or fixture in position prior to the weld element heating and melting step.

Figure 12:
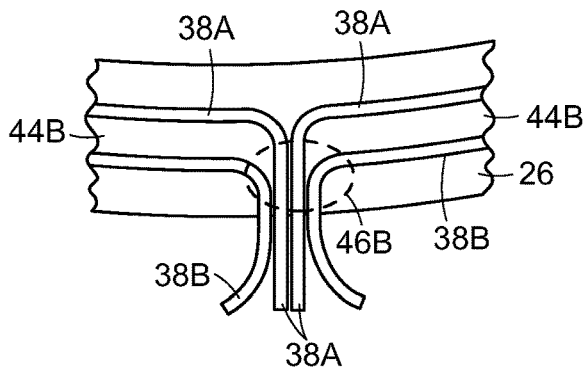
FIG. 12 is a view like looking down on the surface of a flange which has two concentric-running weld elements, with the terminal ends exiting at the same location.

FIG. 12 is a view similar to that of FIG. 5, looking down on a portion of the surface of flange 26 showing another embodiment of the invention. A first weld element loop 38A runs circularly near the inner edge of the flange, and a second slightly larger weld element loop 38B runs circularly radially outward from the first loop, so that annular cavity 44B is created therebetween. The terminal ends of the two loops are closely spaced so that after heating and fusion, a fused mass similar to that previously described will be formed at intersection 46B, shown with a dashed line. In a variation on this embodiment, one loop may be on a first flange and the other loop may be on the mating second flange. In a further variation the terminal ends of one or both elements may run radially inwardly.

Figure 13:
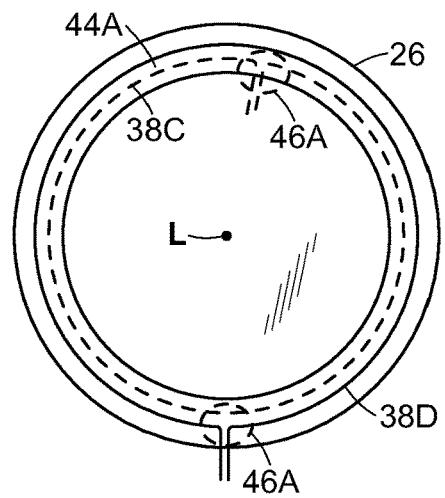
FIG. 13 is a view like FIG. 5A, showing the top of a flange having two almost-circular weld elements that run outwardly from the flange at two different locations.

FIG. 13 is a view like that of FIG. 5A, namely a view looking along the lengthwise axis L at flange 26. two loops, namely loop 38C and loop 38D. One is shown as a dashed line for visual distinction. Each loop runs on a different concentric path and the loops define annular cavity 44A. The terminal ends of the second loop are at a circumferential location different from the location of the terminal ends of the first loop. Care is taken to have good fusion at each of the regions 46A. In this embodiment, the annular cavity is divided into two segments, and each one would have a port, in carrying out the invention. In variations of this and other embodiments, even more subdivisions of the annular cavity (with associated ports) may be made, though it is presently hard to imagine any advantage of such. To the extent the space between the loops is sub-divided into smaller spaces by weld material at locations like regions 46A, then additional access ports may be used for each smaller space, for changing pressure therein.

The fusion weld element(s) may be applied to the faying surface at the factory, so that the base and top may be shipped to a remote assembly site. Alternatively, the weld elements may be tack welded to the faying surface at the remote assembly site. The fusion weld elements may be tack welded to the faying surface of either flange.

In another alternative, not shown, port 42 may run differently than shown in the exemplary embodiments. For example, the port may run through the flange of the part which does not have attached to its surface prior to welding the weld elements; i.e., through flange 28 in FIG. 6. For example, the port may run at an angle to the faying surface or it may follow a non-linear path. In a further variation, the port may be drilled in a flange after welding rather than before welding.

While it would presently appear inferior insofar as effort and cost, as mentioned, in the fusion weld element methodology used to carry out the invention, a weld element might be set within a groove on a faying surface. See the aforementioned '858 application. While there may not be much gap between the flanges in the resultant annular cavity, the gap will be sufficient for flow of air and carrying out the aforementioned weld verification procedure. Optionally, the faying surface one or both flanges may be provided with circumscribing depressions or raised features to provide lengthwise gap space to a cavity 44 that is formed between the circular welds.

While the invention has been described in terms of its application to a tank, that is, to a vessel which has one or both ends closed, the invention can be used on the flanges of other objects including but not limited to such as lengths of pipe or conduits.

For ease of description, the invention has been described with respect to a tank that is used with the length axis vertical and which therefore has a base and a top. However, the invention can be used with plastic tanks and other structures, where the length axis has a non-vertical orientation. The way in which the preferred embodiments have been described and the use of vertical-axis associated nomenclature shall not be construed so as to limit limiting the generality of the invention; and the scope of claims shall comprehend non-vertical axis orientation articles and their equivalent elements.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A method of forming a plastic tank comprised of a tank base and a tank top, the base and top aligned along a lengthwise axis and attached to each other by at least two substantially circular weld joints, which comprises:
   (a) providing each of the base the top with substantially circular flanges, each flange having a faying surface;
   (b) positioning at least one weld element on at least one said flange faying surface, and mating the flange of the base and the flange of the top with each other to capture the at least one element between the faying surfaces of mated flanges, so the at least one weld element may be heated, melted, and fused to the flanges to form a weld joint comprising said at least two substantially circular weld joints; wherein the at least one weld element has a pair of terminal ends, portions of which project radially from said mated flanges;
   (c) heating the at least one weld element to melt and fuse said element to both of said flange faying surfaces, and to solidify said element, thereby to weld the mated flanges to each other;
   wherein, prior to said heating step, the at least one weld element runs around part or all of the faying surfaces of the flanges and has portions which run concentrically to said lengthwise axis thereby to define an annular space between said concentric-running portions;
   wherein said space, after heating, melting and solidification of the at least one weld element, is converted into an annular cavity; and,
   wherein, prior to said heating step, said portions of the terminal ends are in proximity to each other; wherein after said at least one weld element is heated, melted and solidified a fused mass intersection is formed at one or more locations between the mated flanges, said fused mass intersection running at least in part radially, to connect said the melted and solidified concentric-running portions.

2. The method of claim 1 which further comprises:
   (d) providing at least one port for fluid flow, the port running from said annular cavity to an interior or exterior surface of one or both of the welded tank base or tank top; and,
   (e) changing the pressure within the annular cavity by applying pressure or vacuum to the at least one port and monitoring the pressure over time, thereby to determine the soundness of said the melted and solidified concentric-running portions which define the annular cavity.

3. The method of claim 1 wherein the weld element is a single loop having a U shape end, and wherein the U shape end of the loop is located to be part of said intersection.

4. The method of claim 1 wherein a second weld element like said at least one weld element is in addition positioned between said faying surfaces; and wherein the pair of terminal ends of each weld element which run radially outwardly from the flange at the same location.

5. The method of claim 1 wherein a second weld element like said at least one weld element in addition is positioned between said faying surfaces; and wherein a first terminal end of each weld element runs radially inwardly or outwardly from the flange at a first circumferential location; and wherein a second terminal end of each weld element runs radially inwardly or outwardly from the flange at a second circumferential location spaced apart from the first location.

6. The method of claim 1 wherein the faying surfaces of said flanges are non-circular.

7. The method of claim 1 which further comprises providing each the tank base and the tank top with at least one tab radially extending from the flange thereof, each tab positioned to mate with another tab when the faying surfaces of the flanges of the top and base are mated as part of step (b); and, running the terminal ends of the weld elements between mated tabs as part of step (b).

8. The method of claim 7 further comprising: providing at least one port for fluid flow, the port running from said annular cavity to an interior or exterior surface of one of the welded tank parts; and, after step (c) the step of changing the pressure within the annular cavity by applying pressure or vacuum to the port b and monitoring the pressure over time, to thereby determine the soundness of the welds which define the annular cavity.

\* \* \* \* \*